Patented Apr. 28, 1953

2,636,868

UNITED STATES PATENT OFFICE 2,636,868

MATTING AGENTS

Harold S. Lilley and James K. Lovell, Slough, England, assignors to Imperial Chemical Industries Limited, a corporation of Great Britain No Drawing. Application February 28, 1950, Serial No. 146,922. In Great Britain March 2, 1949

1 Claim. (Cl. 260—25)

This invention relates to new matting agents and the process of manufacture of the same.

Whilst many coating compositions, for example enamels, give a glossy surface on drying it is desirable in certain circumstances that the dry film be dull, lustreless or matt. Such a matt finish is sometimes desirable for example in decorative paints applied to walls or ceilings.

One method of obtaining matt finishes is to incorporate into the coating composition large amounts of pigments or extenders such as china clay, diatomaceous earth, etc. Whilst this method gives fairly satisfactory matt finishes the coating compositions so produced are unsatisfactory since on storage the high mineral content tends to settle out and form a hard cake. Further, due to the high mineral content the dry film is rather brittle.

Fatty acid soaps such as aluminium stearate and zinc stearate and certain natural resins such as batu have also been employed as matting agents, but the use of these may result in the dry film having low adhesion and flexibility. These materials also have other disadvantages such as inconsistency in action resulting in a variation in matting effect from batch to batch. In addition their sensitivity to the relatively high temperatures encountered in the milling of the coating compositions may result in gelation of compositions containing them.

An improved type of matting agent which has now been in use for some years consists of the aluminium salt of a rosin modified phenolic resin. These metallic salts are made by dissolving a rosin modified phenolic resin in caustic soda and then adding sufficient of a solution of an aluminium salt to cause substantially complete precipitation of the resin in the form of its aluminium salt. The precipitate is then washed and dried.

We have now found that a matting agent of high efficiency may be made by a more simple process in which a water-soluble phenol formaldehyde resinous condensation syrup is mixed with an aqueous solution of a rosin salt of an alkali metal, the resulting mixture being precipitated by reaction with a water-soluble salt of aluminium or zinc.

The precipitate is then washed free of soluble salts and dried. The chief advantage of this process is that it avoids the necessity of first preparing the rosin modified phenolic resin and the product itself has advantages in high matting efficiency, pale colour, consistency in quality, etc.

In order to produce a matting agent which is neither subject to the disadvantages of a metallic soap per se nor appreciably soluble in the coating composition vehicle it is preferred that the ratio of rosin to phenolic condensation product be between the limits of 2:1 and 10:1.

According to the present invention therefore a process for the manufacture of a matting agent comprises reacting a water-soluble aluminium or zinc salt with a mixture of a water-soluble rosin salt and a water-soluble phenol formaldehyde resinous condensation product.

The invention is illustrated by reference to the following example.

Solution A

A water-soluble phenol formaldehyde resinous condensation product is made by heating together the following ingredients for 4 hours at 90° C.

| | Pounds |
|---|---|
| Diphenylolpropane | 60 |
| Formalin 40% | 25 |
| 2½ NaOH in alcohol | 4 |

Solution B

A solution of sodium rosinate is made by adding 180 lb. crushed rosin to a solution of 24 lb. caustic soda in 200 lb. water. The mixture is maintained at 70–80° C. for one hour.

Solution C 122 lb. aluminium sulphate is dissolved in 122 lb. water and heated to 70° C.

Solutions A and B are cooled to 60° C. and thoroughly mixed together. The mixture is then heated to 70° C. and Solution C slowly added over a period of 8 minutes. Vigorous stirring must be maintained during this addition. The precipitate which forms a stiff pasty mass is washed free of water-soluble salts, spread out on shallow trays and dried. The dried mass is then roughly broken up and ground in an edge-runner mill.

The ground material produced as described in the example is quite stable on storage and samples more than a year old have given results equal to those obtained with freshly prepared material.

The matting agent may be incorporated into varnishes by normal ballmill grinding practice provided that it is first reduced to a fine uniform condition, for example, by edge-runner mill grinding as described in the example.

We claim:

A process for the manufacture of a matting agent which comprises mixing a water-soluble phenol formaldehyde resinous condensation syrup with an aqueous solution of a rosin salt of an alkali metal and precipitating the resulting mixture by reaction with a water-soluble salt selected from the group consisting of aluminum and zinc salts, the water-soluble rosin salt and the phenol formaldehyde resinous condensation syrup being present in the mixture in a ratio of between 2:1 and 10:1 respectively.

HAROLD S. LILLEY.
JAMES K. LOVELL.

References Cited in the file of this patent

UNITED STATES PATENTS

| Number | Name | Date |
| --- | --- | --- |
| 2,266,568 | Rosenblum | Dec. 16, 1941 |
| 2,363,489 | Auer | Nov. 28, 1944 |